Patented June 24, 1930

1,765,620

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO SCHERING-KAHLBAUM A.-G., OF BERLIN, GERMANY

PRODUCTION OF MENTHOL

No Drawing. Application filed June 22, 1928, Serial No. 287,637, and in Germany July 14, 1927.

Our invention refers to the production of menthol and its isomers and the homologues of these compounds.

In the copending application for patent of even date herewith and entitled: "Production of isoalkylenphenols" we have described the thermic decomposition of dihydroxydiphenylmethane-derivatives into alkylenphenols and phenols.

The alkylenphenols thus obtained can be converted into the corresponding cyclohexanols by treating with hydrogen in the presence of a hydrogenation catalyst until eight hydrogen atoms have entered into combination.

We have now found that the dihydroxydiphenylmethanderivatives can be directly converted into cyclohexanols, if thermic decomposition is effected in an hydrogen atmosphere in the presence of a hydrogenation-catalyst until 14 hydrogenatoms have been introduced, according to the formula:

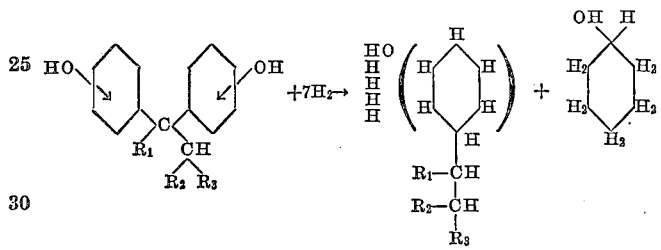

wherein $R_1$, $R_2$ and $R_3$ is a hydrogenatom or an univalent alkyl or $R_1$ and $R_2$ together a bivalent alkylen radical, forming with the two adjacent carbon atoms a cyclic system and wherein the two aryl nuclei also can have other substituents.

We have further found it preferable to add besides the hydrogenation-catalyst another catalyst capable of reducing the temperature at which thermic decomposition occurs. Such catalysts are porous bodies, known as surface-catalysts for instance "Frankonite," "Tonsil," fuller's earth, silica gel, active carbon and such like bodies. In carrying out the decomposition and hydrogenation it is sufficient to add besides the hydrogenation catalyst 0.5–1.0% of the surface catalyst of the weight of the dihydroxydiphenylmethane derivative. A surface catalyst upon which the hydrogenation catalyst is precipitated also can be used.

A dihydroxydiphenylmethane derivative, which undergoes very easily the joint decomposition and hydrogenation (spoken of) is the 2,2'-dihydroxy-4,4'-dimethyldiphenyldimethylmethane, which can be obtained according to the process described in our copending application of even date entitled "A new condensation product from meta-cresol and acetone."

Example 1

4,4'-dihydroxydiphenyldimethylmethane is treated in the presence of 3% of its weight of an ordinary hydrogenation-catalyst with hydrogen under pressure at 250–280° C. until no further hydrogen is taken up. From the reaction product 4-isopropylcyclohexanol and 4-isopropylcyclohexanon can be separated besides cyclohexanol and cyclohexanon by fractional distillation.

Example 2

4,4'-dimethyl-2,2'-dihydroxydiphenydimethylmethane is treated with hydrogen as described in Example 1 at 215–220° C. A mixture of the different stereoisomeric menthols and menthones with 3-methylcyclohexanol and 3-methylcyclohexanon is obtained.

Example 3

4,4'-dihydroxdiphenyldimethylmethane is after the addition of 3% of an ordinary hydrogenation-catalyst and 0.5% of tonsil treated with hydrogen at 170–180° C. till no further hydrogen is taken up. From the reaction product 4-isopropylcyclohexanol and cyclohexanol can be separated besides small quantities of 4-isopropylcyclohexanone and cyclohexanone.

*Example 4*

4,4' - dimethyl - 2,2' - dihydroxydiphenydimethylmethane is treated as described in Example 3 with hydrogen at about 180° C. in the presence of Frankonite upon which a nickel- cobalt- copper-catalyst has been precipitated. A mixture of the different stereoisomeric menthols and menthones with 3-methylcyclohexanol and 3-methylcyclohexanon is obtained.

*Example 5*

4,4'-dihydroxydiphenylmethylmethane is, after the addition of Frankonite upon which a nickel- cobalt- copper-catalyst has been precipitated, treated with hydrogen under pressure at 150° C. until no further hydrogen is taken up. Ethylcyclohexanol and cyclohexanol are obtained, which can be separated by fractional distillation.

Various changes may be made in the details disclosed in the foregoing specification without departing from the invention or sacrificing the advantages thereof.

We claim:

1. The process of producing alkylcyclohexanols comprising heating a dihydroxydiphenylmethane-derivative in a hydrogen atmosphere at a temperature from about 150° C. to 280° C. in the presence of a hydrogenation catalyst and of a contact mass having a high porosity until no further hydrogen is taken up.

2. The process of producing alkylcyclohexanols comprising heating a dihydroxydiphenylmethane-derivative in a hydrogen atmosphere at a temperature from about 150° C. to 230° C. in the presence of a contact mass having a high porosity upon which a hydrogenation-catalyst has been precipitated until no further hydrogen has been taken up.

3. The process of producing menthol comprising heating 4,4'-dimethyl-2,2'-dihydroxydiphenyldimenthylmethane in a hydrogen atmosphere at a temperature from about 180° C. to 220° C. in the presence of a hydrogenation catalyst and of a contact mass having a high porosity until no further hydrogen has been taken up.

4. The process of producing menthol comprising heating 4,4'-dimethyl-2,2'-dihydroxydiphenyldimethylmethane in a hydrogen atmosphere at a temperature from about 180° C. to 220° C. in the presence of a contact mass having a high porosity upon which a hydrogenation catalyst has been precipitated until no further hydrogen has been taken up.

WALTER SCHOELLER.
HANS JORDAN.
REINHARD CLERC.